US012000275B2

(12) United States Patent
Stewart

(10) Patent No.: US 12,000,275 B2
(45) Date of Patent: Jun. 4, 2024

(54) GEOPRESSURE INTEGRATION BETWEEN DEEP WELLS BY MULTIPLE DATUMS AND PRESSURE CORRECTIONS

(71) Applicant: Saudi Arabian Oil Company, Dhahran (SA)

(72) Inventor: Simon A. Stewart, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 304 days.

(21) Appl. No.: 17/215,669

(22) Filed: Mar. 29, 2021

(65) Prior Publication Data

US 2022/0307369 A1    Sep. 29, 2022

(51) Int. Cl.
*E21B 49/00* (2006.01)
*E21B 47/06* (2012.01)
*G01V 11/00* (2006.01)

(52) U.S. Cl.
CPC .............. *E21B 49/00* (2013.01); *E21B 47/06* (2013.01); *G01V 11/002* (2013.01)

(58) Field of Classification Search
CPC ........ E21B 47/06; E21B 49/00; G01V 11/002
See application file for complete search history.

(56) References Cited

U.S. PATENT DOCUMENTS

| | | | |
|---|---|---|---|
| 4,440,020 A * | 4/1984 | Boutemy | G01V 11/002 702/6 |
| 6,446,014 B1 | 9/2002 | Ocondi | |
| 8,360,148 B2 | 1/2013 | Atwood et al. | |
| 2003/0004648 A1* | 1/2003 | Huffman | G01V 1/32 702/14 |

(Continued)

FOREIGN PATENT DOCUMENTS

WO    WO 2005051069       6/2005
WO    WO-2017160162 A1 *  9/2017  ............. G01V 1/003

OTHER PUBLICATIONS

Atashbari and Tingay, "Pore pressure prediction in carbonate reservoirs," SPE 150835, Society of Petroleum Engineers (SPE), presented at the SPE Latin American and Caribbean Petroleum Engineering Conference, Mexico City, Mexico, Apr. 16-18, 2012, 20 pages.

(Continued)

*Primary Examiner* — Yoshihisa Ishizuka
(74) *Attorney, Agent, or Firm* — Fish & Richardson P.C.

(57) ABSTRACT

Systems and methods include a computer-implemented method for displaying well information. Geological boundaries are identified for a group of multiple wells in a region including a reference well. Each well has geological boundaries at depths different from boundaries in the reference well. A framework of the geological boundaries of the reference well multiple wells is treated as a set of datums for shifting pressures relative to the reference well. Geological boundaries of the group of multiple wells are matched, including identifying tops and bases of geological layers for each well. Depth shifts for depths having corresponding pressure data are determined. The depth shifts are redatumed based on differences in depth of the geological layers of each well. A display of a graph is presented in a graphical user interface (GUI). The graph maps pressures of the group of multiple wells at different depths and based on redatuming of each well.

20 Claims, 6 Drawing Sheets

(56) References Cited

U.S. PATENT DOCUMENTS

| | | | |
|---|---|---|---|
| 2005/0114031 A1* | 5/2005 | Michael Thambynayagam | G01V 99/00 702/12 |
| 2011/0172976 A1* | 7/2011 | Budiman | E21B 47/04 703/2 |
| 2013/0144531 A1* | 6/2013 | Johnston | E21B 44/00 702/9 |
| 2018/0080310 A1* | 3/2018 | Sorenson | E21B 44/005 |
| 2019/0114352 A1* | 4/2019 | Sung | G06F 16/26 |
| 2021/0102457 A1* | 4/2021 | Dupont | E21B 47/04 |

OTHER PUBLICATIONS

Finkbeiner et al., "Stress, pore pressure, and dynamically constrained hydrocarbon columns in the South Eugene Island 330 field, northern Gulf of Mexico," American Association of Petroleum Geologists (AAPG), American Association of Petroleum Geologists Bulletin, Jun. 2001, 85(6):1007-1031.

Li et al., "Anomalous Pore Pressure and its Relation with In-Situ Stress Regime in Deepwater Play," SPE 145686, Society of Petroleum Engineers (SPE), presented at the SPE Annual Technical Conference and Exhibition, Denver, Colorado, Oct. 30-Nov. 2, 2011, 6 pages.

Suppe, "Fluid overpressures and strength of the sedimentary upper crust," Journal of Structural Geology, Dec. 2014, 69(B):481-492.

Traugott, "Pore/fracture pressure determinations in deep water," Deepwater Technology, Supplement to World Oil, 1997, 218(8):68-70.

Yardley and Swarbrick, "Lateral transfer: a source of additional overpressure?" Marine and Petroleum Geology, Apr. 1, 2000, 17(4):523-537.

Zhang, "Effective stress, porosity, velocity and abnormal pore pressure prediction accounting for compaction disequilibrium and unloading," Marine and Petroleum Geology, Aug. 2013, 45:2-11.

* cited by examiner

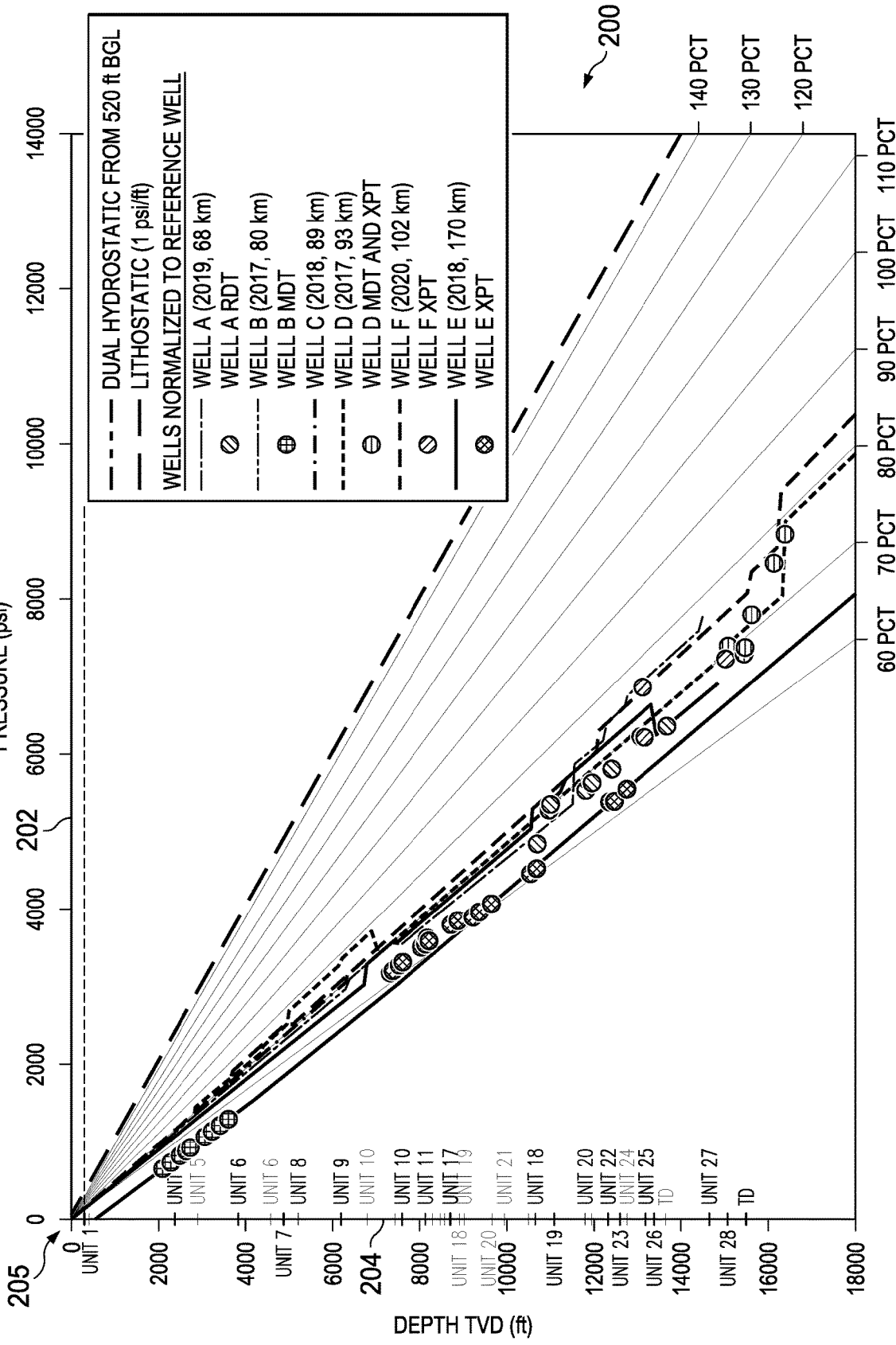

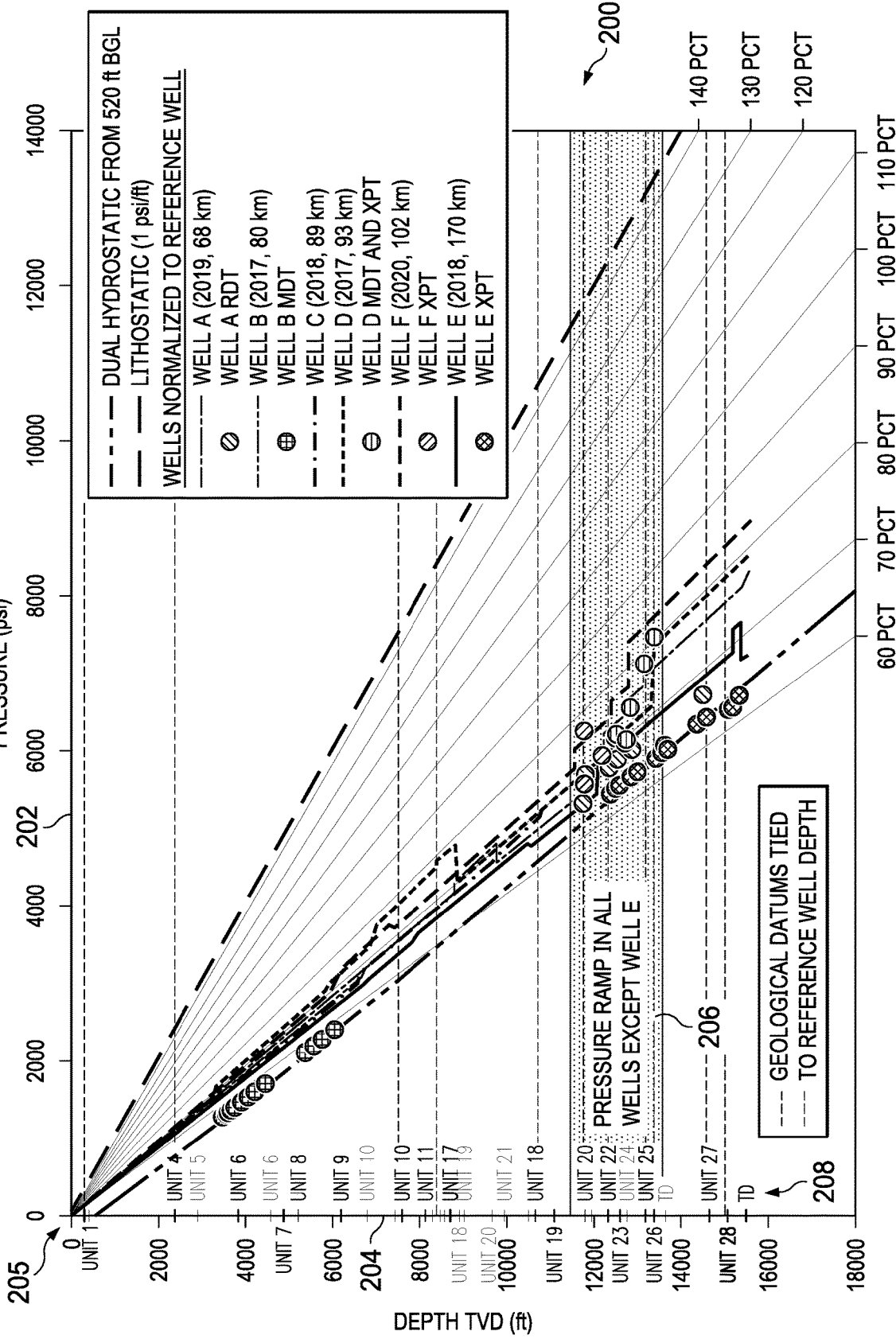

GEOPRESSURE INTEGRATION BETWEEN DEEP WELLS BY MULTIPLE DATUMS AND PRESSURE CORRECTIONS

TECHNICAL FIELD

The present disclosure applies to techniques for effectively integrating measurements of subsurface fluid pressure information of different types and from diverse sources.

BACKGROUND

Deep wells for subsurface projects, such as oil and gas exploration, geothermal energy, water extraction, and geological carbon dioxide ($CO_2$) sequestration, typically involve drilling through rocks whose pores are naturally saturated with fluid, usually saline water. The pressure of these pore fluids may determine the optimized drilling parameters to ensure efficient and safe drilling, free from unconstrained pore fluid flow to surface (blowout). In addition, the profile of pore fluid pressure with depth contains much information about the layering and regional organization of rocks in the subsurface, which may be critical information relating to commerciality of the project at hand. Therefore, there is high value in using existing knowledge of pore pressures to help plan the location and then the actual drilling of wells in a fully-optimized and safe manner. Knowledge of pore pressures can come from direct pore pressure measurements using specialized tools such as repeat formation testers (RFTs) in existing wells in the area. There may also be indirect pressure measurement data such as drilling mud weight with depth in existing wells. It is common practice to plot such existing pressure information on a pressure versus depth chart in order to graphically assess trends in pressure with depth. Plotting such graphs can become challenging when several wells with multiple types of pressure information are available, because, the geological layers are rarely exactly horizontal. As a result, the pressure information in one well and corresponding pressure information from the same layer in another well, where that layer is at a different depth, will cause the information to be displayed at different depths on the same pressure—depth chart. In many types of project such as oil and gas, or $CO_2$ sequestration, wells may be many kilometers apart, and corresponding geological layers may be at significantly different depths in each well. In spite of this problem, pressure data is invariably displayed in relation to a single depth datum such as Mean Sea Level (MSL). This can lead to a considerable spread of data with depth and important characteristics of the data in relation to the geology are obscured.

SUMMARY

The present disclosure describes techniques that can be used for effectively integrating measurements of subsurface fluid pressure information of different datum types and from diverse sources into a single geological reference frame. This can lead to revealing key information that supports well design and project commerciality for oil and gas, carbon dioxide ($CO_2$) sequestration, geothermal, and water management projects.

In some implementations, a computer-implemented method includes the following. A set of geological boundaries are identified for a group of multiple wells in a region that includes a reference well. Each well of the group of multiple wells has geological boundaries at different depths from same geological boundaries in the reference well. A framework of the geological boundaries of the reference well and the group of multiple wells is treated as a set of datums for shifting pressures relative to the reference well. Geological boundaries of the group of multiple wells are matched, including identifying tops and bases of geological layers for each well of the group of multiple wells. Depth shifts for depths having corresponding pressure data are determined using the matched geological boundaries. The depth shifts are redatumed based on differences in depth of the geological layers of each well. A display of a graph is presented in a graphical user interface (GUI). The graph maps pressures of the group of multiple wells at different depths and based on redatuming of each well of the group of multiple wells to a datum of the reference well.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. The techniques can be used to solve the technical problem of comprehending different kinds of pressure data (of different datums) obtained from deep wells. Comprehension may otherwise not occur (and the data not understood) because wells are either considered on a standalone basis or, if combined, the integrated pressure data sets are difficult to interpret. The techniques of the present disclosure can be used to solve the technical problem of a multiple datum handling technique, based on geological surfaces that can be recognized in all relevant wells, to remove the depth effects of geological structures which are the main source of scatter in integrated multi-well pressure datasets. The techniques can be used to enable the coordination and combination of pressure data from several wells, that may be drilled into the same geological layers at different depths at the respective well locations, into a single chart that normalizes all geological structural depth variations between wells. The information can be used to optimize required parameters, locations, and safe drilling of wells drilled in exploration, development, and production settings for petrochemical companies $CO_2$ sequestration companies undertaking deep well drilling operations. The techniques provide an improvement over conventional techniques in which pressure data from all wells are handled with reference to a single datum, usually Mean Sea Level (MSL). Such conventional techniques have the disadvantage of not removing depth-scatter in the data arising from varying geological structures. The techniques of the present disclosure solve this problem by handling and accounting for multiple subsurface datums. This is an improvement over conventional systems that do not address the depth scatter of pressure data arising from differences in geological structure.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

FIGS. 2A and 2B are graphs showing example results of redatuming using real well data, according to some implementations of the present disclosure.

Like reference numbers and designations in the various drawings indicate like elements.

DETAILED DESCRIPTION

Figure 1A:
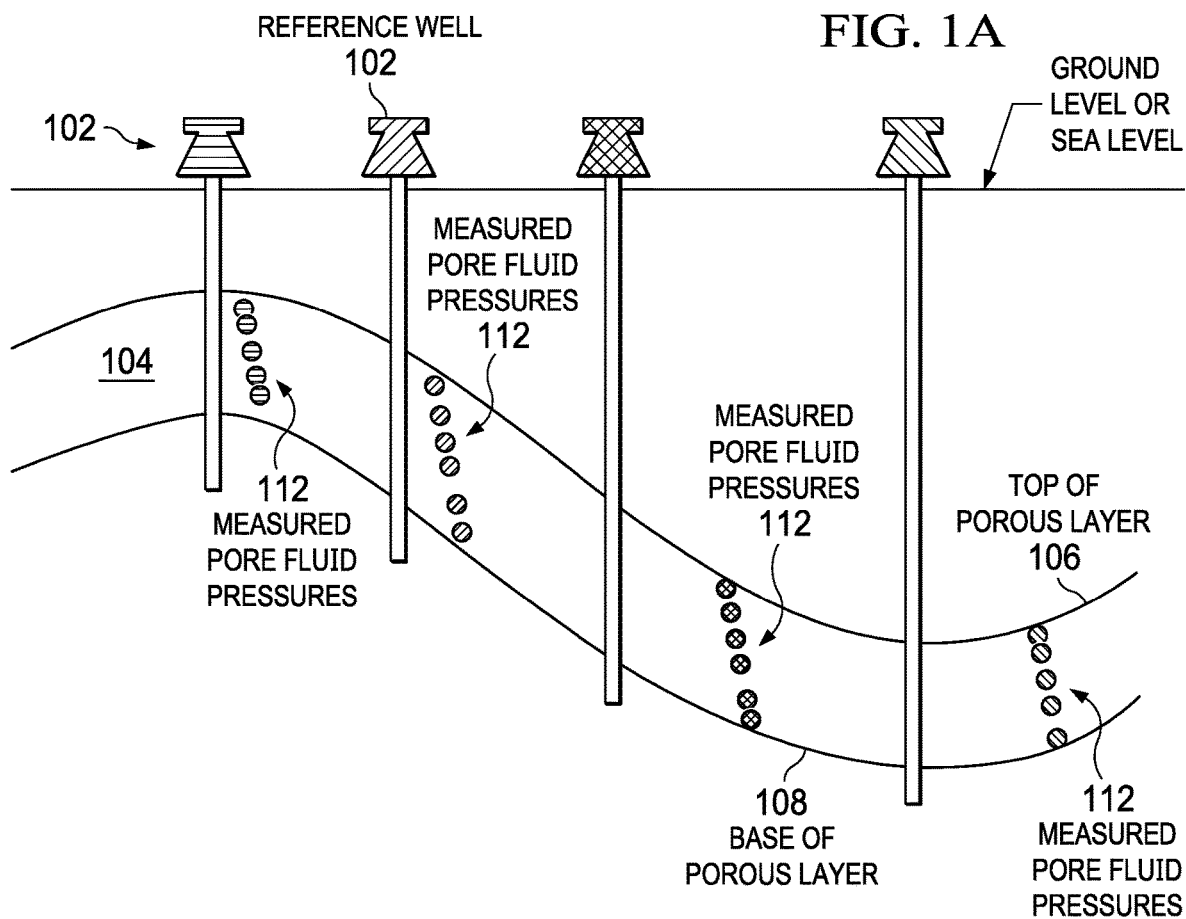
FIGS. 1A-1C are graphs showing examples of basic multiple-datuming, according to some implementations of the present disclosure.

The following detailed description describes techniques used for effectively integrating measurements of subsurface fluid pressure information of different datum types and from diverse sources into a single geological reference frame. Doing so can reveal key information that feeds into well design and project commerciality for oil and gas, carbon dioxide ($CO_2$) sequestration, geothermal, and water management projects. In general, "datum" is being used throughout this disclosure in a general sense of a reference level. Here, "datum" refers to the set of geological units that are identified in a reference well and the offset well(s). Each of these units is treated as a datum. This is different from some interpretations of datum which might be a single reference surface from which all depths are measured, Mean Sea Level (MSL) for instance, which may be the same in all wells in an area of interest.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The pressure of pore fluids affects the commerciality of subsurface projects in general, as domains of pressure continuity can be handled as single subsurface parcels with economies of scale in terms of required numbers of wells. Likewise, the location and nature of subsurface boundaries between pressure domains can be used to determine the detailed location of planned wells and the delineation of subsurface pore volumes that may contain valuable commodities such as potable water or hydrocarbons, or be used for long-term sequestration of materials such as $CO_2$. An additional element of value from subsurface pressure information is to enable detailed well design that optimizes required engineering versus maintenance of required safety margins during the drilling operations through the maintenance of the correct balance between drilling fluid density and pore fluid pressure exposed during drilling. Pressure measurements can be acquired from wells to build up a picture, map, or model of subsurface pressures and pressure boundaries. There are direct pressure measure methods involving a probe that physically measures pore fluid pressures in rocks exposed to an open wellbore during a drilling operation, for example, using repeat formation tester or modular dynamic tester techniques. There are also indirect methods of measuring pressure while drilling, such as to capture and store a record of drilling mud density with depth. Drilling mud density can be continuously monitored and adjusted if necessary in response to any pressure-driven pore fluid influxes into wellbores, so this information is available from every drilled well. To fully understand the significance of drilling mud density variation with depth, the casing extents from the corresponding well should be concurrently plotted, to distinguish between mud weight variations that are a response to the geology versus variations that are facilitated by mechanical isolation of certain formations. This is an example of the type of more advanced data compilation that can easily be incorporated in this embodiment.

Figure 3:
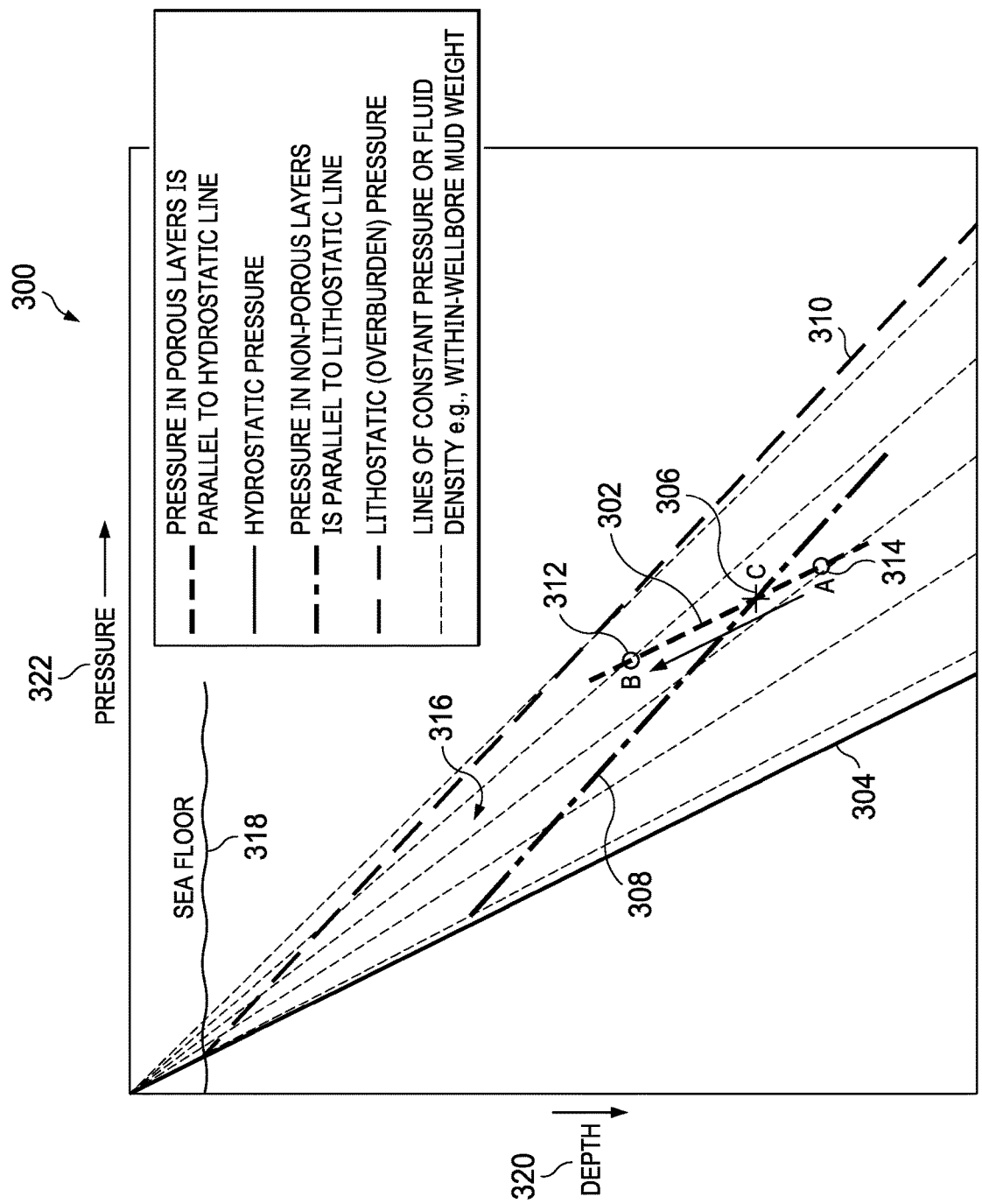
FIG. 3 is a graph showing an example of a centroid concept, according to some implementations of the present disclosure.

Pressure data, whether directly or indirectly measured, can be plotted on pressure-depth graphs. Such graphs can use a single datum, for example, Mean Sea Level (MSL), to remove the effect of rig height or to remove ground elevation differences in the case of onshore wells. For the purposes of this description, "datum" refers to a horizontal surface (for example, surface parallel to MSL) at a given depth from which various depths are measured. However, this datuming does not account for variations in geological structure, which can cause significant depth variations of correlative porous layers from one well to another. Geological structure variations can be due to depositional thickness variations of porous units, or post-depositional tectonic folding and faulting. Geological structure variations can lead to significant depth variations of correlative units between wells, for instance, in the order of thousands of feet or many tens of percent of the depth of the well itself. The presence of varying geological structures can lead to considerable scatter in pressure data on pressure-depth graphs, even if those graphs are datumed to MSL. This challenge can be solved using techniques of the present disclosure through the application of multiple datums combined with a method for shifting pressure data in depth while retaining the key information contained in the pressure measurements. The Pressure-Depth space that is the basis for the analysis in this embodiment, as seen in FIGS. 2A, 2B and 3 is not the only space in which this redatuming technique can be employed. The idea can also be applied if some other way of representing pressure is plotted with respect to depth, such as fluid weight, for example in units of Pounds per Cubic Feet (pcf), defining a PCF— Depth space. The redatuming technique at the heart of this disclosure can equally be applied in such a space, or any other space where pressure information is plotted with respect to depth.

This present disclosure describes techniques for solving the problem of a considerable spread of data with depth and important characteristics of the data in relation to the geology that are obscured due to multiple datums identified and verified in each well. In effect, this imposes a depth-independent geological reference frame on the data. Accurate shifting or redatuming of pressure data from one well to another can be achieved by using a "centroid" technique. For example, pressures in porous units can be aligned parallel to water or hydrostatic gradients and therefore can be shifted along these gradients rather than moved vertically on a pressure depth graph (which may introduce errors). A multiple number of datums can be used. In practice, ten to twenty datums can suffice to redatum full wellbore datasets, spanning up to ten or twenty thousand feet in depth in a given well, over wide areas, for instance tens to hundreds of kilometers (in fact as far as the geological layers are correlatable). These techniques can be used to compact datasets that may otherwise be spread over large depth ranges. The normalized pressure plots can then be used for detailed geological analysis or well planning. A principal value arising from this is in ultimately reducing the number of wells required in development projects by identifying pressure domains in the reservoir and matching the well count and locations within each domain as a sub-development. Secondly, the drilling of individual wells can be made more efficient through the existence of more accurate knowledge of reservoir pressures, enabling optimized, reduced well design requirements and reduced lost time due to drilling problems.

Figure 1B:
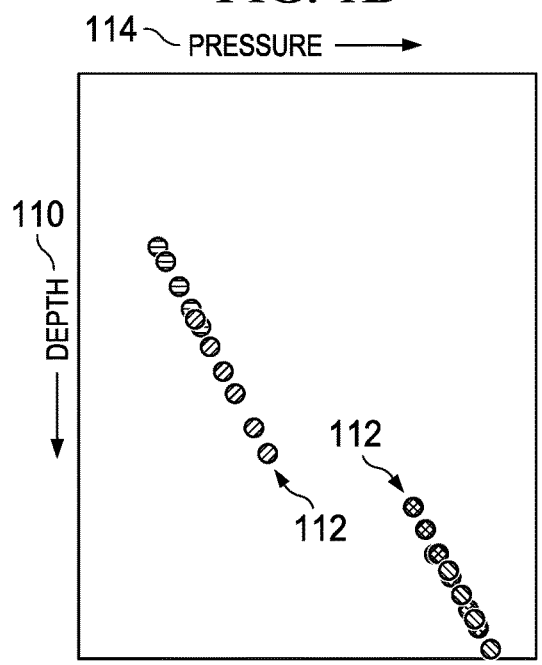
Figure 1C:
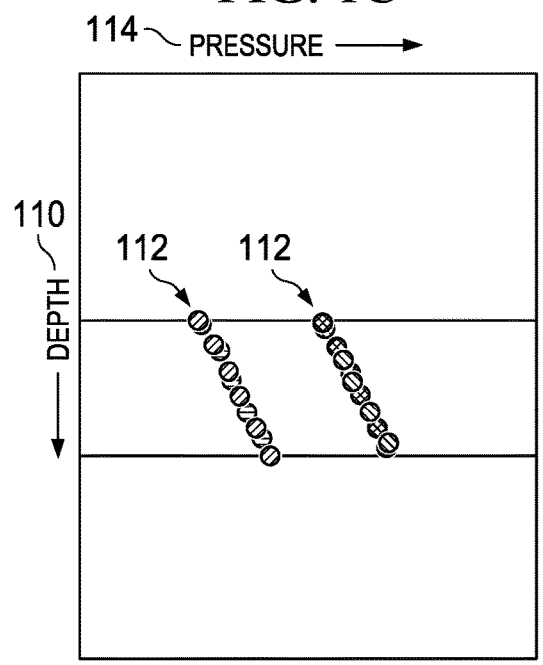

FIGS. 1A-1C are graphs showing examples of basic multiple-datuming, according to some implementations of the present disclosure. In this example, four wells 102 are drilled to a porous layer 104 (with a top 106 and a base 108). The technique of the present disclosure could be used for two to two hundred wells or more. The porous layer 104 is present at different depths 110 in different places due to geological structuring. Direct pressure measurements 112 (for example, measured pore fluid pressures) can be obtained from the porous layer in each well, with measurements indicated in FIGS. 1A-1C using shaded circles of different shades corresponding to the different shading representing the wells 102. If these data are simply plotted directly on a pressure-depth plot relative to depth 110 and pressure 114, the data will be scattered over a wide depth range, as shown in FIG. 1B. Redatuming relative to the top 106 and the base 108 of the porous layer 104, as identified in each well 102, provides a clearer display of the information in relation to the geological layering, as shown in FIG. 1C.

Pressure measurements can be difficult to compare from one well to another due to variations in geological structure. The variations can mean, for example, that a porous aquifer observed in one well may be significantly shallower or deeper in another well (FIG. 1A). As a result, when pressure data is obtained from different wells, the pressure data can appear scattered on a pressure-depth graph (as shown in FIG. 1B, for example). This scattering can make the integration of pressure data from several wells difficult to interpret. A solution that removes the depth differences between wells includes using multiple datums consisting of at least the top and base of porous units of interest (as shown in FIG. 1C, for example). Conventional systems, for example, typically are not known to use multiple datums to overcome depth scatter in multi-well pressure datasets resulting from varying geological structures. In practice, all of the main stratigraphic units in the well can be utilized as a framework of multiple datums (FIGS. 2A-2B).

FIGS. 2A and 2B are graphs showing example results of redatuming using real well data, according to some implementations of the present disclosure. FIG. 2A shows what data looks like without the redatuming techniques of the present disclosure. FIG. 2B shows how the data look if replotted using the techniques. In FIG. 2A, pressure information 202 (for example, in psi) is plotted according to a depth 204 (for example, in feet) at which the pressure data were obtained in each well 205. Different wells 205 are depicted in FIGS. 2A and 2B using different line styles. The data for each of the wells 205 (in relation to other wells) is scattered and difficult to interpret in relation to key geological datums. In FIG. 2B, the data are replotted in terms of depth in a single reference well. Data from the other wells are redatumed using a framework of geological layers that are recognized in the reference well and the other well(s). Devices mentioned in FIGS. 2A and 2B include Pressure Express (XPT), Modular Dynamic Tool (MDT), and Reservoir Description Tool (RDT).

The use of multiple datums (and then redatuming) significantly enhances the ease of comparison of pressure data between wells where there is significant geological structure variation between wells. In this particular example, it can be seen on the multiple datumed plot that there is a significant pressure ramp 206 in the layers 208 represented by Units 22 through 26 in all wells except well E (as shown in FIG. 2B), a conclusion that would be difficult to reach without the enhancement of multiple datuming. The layers 208 can occur different depths below ground level (BGL). An example implementation of a geological datum framework follows.

In some implementations, the implementation of multiple datuming is achieved in two steps. First, a set of geological boundaries that can be identified with high confidence in multiple wells is picked in a reference well. The same surfaces are identified in each of the other wells that contain pressure data. Depth shifts are determined from the difference in depth of these surfaces between the wells. The depth shifts are compiled into lookup tables that give the depth shift of a given item of pressure data in the offset well to bring it to an equivalent depth in the reference well. An example lookup table is given in Table 1:

TABLE 1

Lookup Table

| | Reference Well | Offset Well | Depth Shift |
|---|---|---|---|
| | 0 | 0 | 0 |
| Unit 1 | 285 | 191 | 94 |
| Unit 2 | 2380 | 1729 | 651 |
| Unit 3 | 3850 | 1952 | 1898 |
| Unit 4 | 4890 | 2720 | 2170 |
| Unit 5 | 5235 | 2786 | 2449 |
| Unit 6 | 6200 | 3670 | 2530 |
| Unit 7 | 7590 | 5026 | 2564 |
| Unit 8 | 8150 | 5540 | 2610 |
| Unit 9 | 8720 | 6221 | 2499 |
| Unit 10 | 10650 | 8684 | 1966 |
| Unit 11 | 10700 | 8803 | 1897 |
| Unit 12 | 11100 | 9262 | 1838 |
| Unit 13 | 11770 | 10697 | 1073 |
| Unit 14 | 11820 | 10991 | 829 |
| Unit 15 | 12360 | 11796 | 564 |
| Unit 16 | 12600 | 12006 | 594 |
| Unit 17 | 13200 | 12852 | 348 |
| Unit 18 | 13380 | 13017 | 363 |
| Unit 19 | 14650 | 13757 | 893 |
| Unit 20 | 15100 | 14126 | 974 |
| Unit 21 | 15500 | 14490 | 1010 |

Table 1 is an example lookup table based on 21 geological units picked in the reference well and an offset well that is to be redatumed to the reference well using all 21 datums. Depth units are arbitrary. All the depth shifts are positive in this example, because the geological layers are all shallower in the offset well than the reference well. But in general the depth shifts could be positive or negative.

Since the amount of depth shifting may vary from one datum to another (for example, the amount of depth shift can vary with depth), the depth shifts are linearly interpolated from one datum to another to avoid discontinuities in the amount of shift. A separate, unique depth shift lookup table can be developed in this way for each well. In addition to the depth shift lookup table, a formula can be implemented to give an appropriate pressure shift for each depth shifted pressure point. The formula can solve the problem in which, if the pressure data are shifted in depth but the pressure is unchanged, the pressures will become spurious. In some implementations, the pressure shift formula can be similar to conventional formulas used for pressure predictions within inclined aquifers, for example. Research has demonstrated that the pressure variation in an inclined, permeable aquifer varies according to a gradient determined by the density of the fluid in that aquifer. In some implementations, FIGS. 2A and 2B can include convenient reference frames for pressure (for example, in psi) and mud weight (for example, in pcf) for ease of quantitative interpretation.

In some implementations, the pressure shift formula can be given by:

$$P2=(Z2-Z1)*\text{gradient}+P1 \qquad (1)$$

where P1 is an unshifted pressure value, P2 is a shifted pressure value, Z1 is an unshifted depth value, Z2 is a shifted depth value, and gradient is a pressure unit change per depth unit change. This may typically be selected to be a gradient representing pore water density of saline aquifers such as 0.45 pounds per square inch per foot (psi/ft). A range of possible subsurface water densities is approximately 0.433 psi/ft (fresh water) to 0.51 psi/ft (brine). Units may be, for example, pressure in psi, depth in feet, gradient in psi/ft.

FIG. 3 is a graph 300 showing an example of a centroid concept, according to some implementations of the present disclosure. The centroid concept uses techniques and concepts described in the present disclosure to significantly build upon simpler ideas in industry. For example, it has been demonstrated, based on numerous case studies, that pressures in an inclined porous aquifer line up on a gradient line 302 parallel to hydrostatic gradient line 304. A Centroid (C) 306 is a point where the aquifer pressure 308 equals the pressure in adjacent low-permeability units, whose pore pressure varies with depth at a gradient matching lithostatic trend 310. The Centroid point itself is not relevant to the present case. The relevant part is that, the pressure at a given Point B 312 in a porous aquifer can be predicted from a known point in the same porous aquifer, for example, at a Point A 314. This provides a method for redatuming known points (for example, Point A) to any other depth (for example, Point B) as necessary for direct comparison using redatuming with pressure data from other wells. The graph 300 shows lines of constant fluid density 316 below a sea floor 318 and relative to a depth 320 and a pressure 322.

Apart from localized hydrocarbon accumulations, water is the ubiquitous pore fluid in the subsurface of sedimentary basins relevant to oil and gas, CO2 sequestration and so on. The water gradient will be in the range 0.433-0.5 pounds per square inch per foot (psi/ft) (for example, whose exact value can be determined primarily by salinity), which may be constrained by direct local sample measurements or regional knowledge. Both the depth shift and the pressure shift are relatively straightforward to program by someone who is skilled in coding. A prototype can be developed using a spreadsheet application, though this can require manual input and conditioning of the input data. Presentation of the results can be made on a chart in appropriate software such as a spreadsheet application (FIGS. 2A-2B).

A workflow (as described with reference to FIG. 4) can be used to remove the effects of geological structure when pressure data from several wells are combined in a single chart. This multiple datuming technique is not mentioned or illustrated in conventional systems, and is useful to highlight pressure variations in relation to geological strata that may otherwise be obscured by scatter in data induced by varying geological structures. Recognition of pressure boundaries made possible by redatuming and displaying the results provide commercial and safety benefits.

Figure 4:
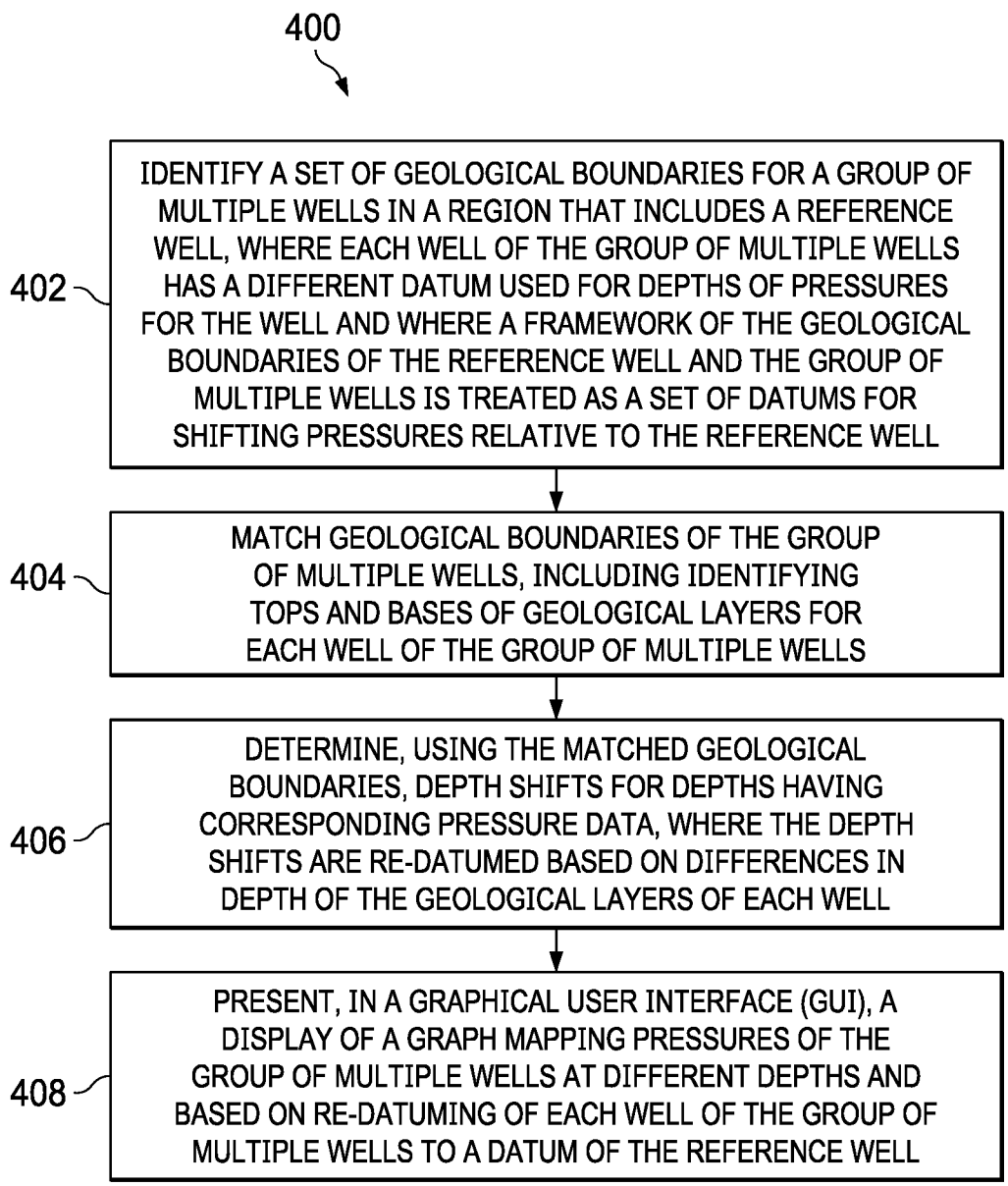
FIG. 4 is a flowchart of an example of a method for generating a display of depth-pressure plots for multiple wells using redatuming to a datum of a reference well, according to some implementations of the present disclosure.

FIG. 4 is a flowchart of an example of a method 400 for generating a display of depth-pressure plots for multiple wells using redatuming to a datum(s) of a reference well, according to some implementations of the present disclosure. For clarity of presentation, the description that follows generally describes method 400 in the context of the other figures in this description. However, it will be understood that method 400 can be performed, for example, by any suitable system, environment, software, and hardware, or a combination of systems, environments, software, and hardware, as appropriate. In some implementations, various steps of method 400 can be run in parallel, in combination, in loops, or in any order.

At 402, a set of geological boundaries is identified for a group of multiple wells in a region that includes a reference well. Each well of the group of multiple wells has a different set of datums used for depths of pressures for the well. For example, the geographical boundaries of wells 102 can be determined, as described with reference to FIG. 1A.

In some implementations, method 400 further includes determining a pressure-depth lookup table for each given well of the group of multiple wells, where each pressure-depth lookup table provides, for each given well and each different datum for the given well, a depth shift of a given well to adjust pressure data for the given well relative to an offset for an equivalent depth in the reference well, where determining the depth shift includes looking up values in the pressure-depth lookup table for each given well, and where depth shifts are linearly interpolated from one datum to another to avoid discontinuities in an amount of shift. From 402, method 400 proceeds to 404.

At 404, geological boundaries of the group of multiple wells are matched, including identifying tops and bases of geological layers for each well of the group of multiple wells. For example, the tops and bases of the geological boundaries of wells 102 can be matched, as described with reference to FIG. 1B. From 404, method 400 proceeds to 406.

At 406, depth shifts for depths having corresponding pressure data are determined using the matched geological boundaries. For example, determining the depth shifts can include using a depth-shift formula (for example, Equation (1)) that varies based on depth and datum, and where the depth-shift formula provides an appropriate pressure shift for each depth shifted pressure point. The depth-shift formula can based on a formula used for pressure predictions within inclined aquifers, including predicting pressures based on a gradient determined by a density of fluid in the inclined aquifers. The depth shifts are redatumed based on differences in depth of the geological layers of each well and the different datums of the group of multiple wells. From 406, method 400 proceeds to 408.

At 408, a display is presented that includes a graph mapping pressures of the group of multiple wells at different depths and based on redatuming of each well of the group of multiple wells to a datum of the reference well. As an example, the displays described with reference to FIGS. 2A-2B can be presented. The display of FIG. 2A can be identified to the user as the redatumed version of the information.

In some implementations, method 400 can further include receiving, through the GUI, user input for optimizing parameters, locations, and safe drilling of wells drilled in exploration, development, and production settings for petrochemical companies or CO2 sequestration companies undertaking deep well drilling operations. For example, the GUI that presents the graph described with reference to FIG. 3 can also include controls presented to the user for acting on the information presented. The user input using the controls and providing additional information can include, for example, user selections of parameters to optimize a selected well of the group of multiple wells. The GUI can present maps of areas encompassing the group of multiple wells, providing the user with the ability to drill down to specific well information and to identify specific geographical locations and parameters for drilling operations. After 408, method 400 can stop.

Figure 5:
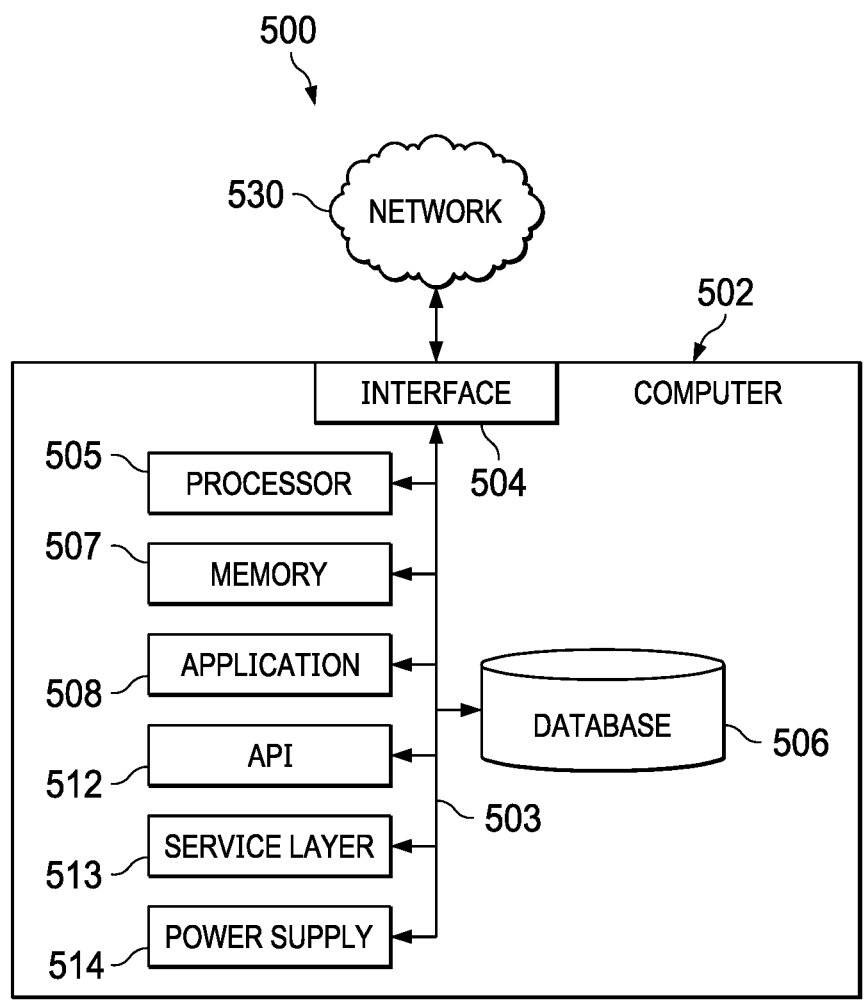
FIG. 5 is a block diagram illustrating an example computer system used to provide computational functionalities associated with described algorithms, methods, functions, processes, flows, and procedures as described in the present disclosure, according to some implementations of the present disclosure.

FIG. 5 is a block diagram of an example computer system 500 used to provide computational functionalities associated with described algorithms, methods, functions, processes, flows, and procedures described in the present disclosure, according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a top level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both) over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases)

according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Described implementations of the subject matter can include one or more features, alone or in combination.

For example, in a first implementation, a computer-implemented method includes the following. A set of geological boundaries are identified for a group of multiple wells in a region that includes a reference well. Each well of the group of multiple wells has geological boundaries at different depths from same geological boundaries in the reference well. A framework of the geological boundaries of the reference well and the group of multiple wells is treated as a set of datums for shifting pressures relative to the reference well. Geological boundaries of the group of multiple wells are matched, including identifying tops and bases of geological layers for each well of the group of multiple wells. Depth shifts for depths having corresponding pressure data are determined using the matched geological boundaries. The depth shifts are redatumed based on differences in depth of the geological layers of each well. A display of a graph is presented in a graphical user interface (GUI). The graph maps pressures of the group of multiple wells at different depths and based on redatuming of each well of the group of multiple wells to a datum of the reference well.

The foregoing and other described implementations can each, optionally, include one or more of the following features:

A first feature, combinable with any of the following features, the method further including determining a pressure-depth lookup table for each given well of the group of multiple wells, where each pressure-depth lookup table provides, for each given well and a different datum for the given well, a depth shift of a given well to adjust pressure data for the given well relative to an offset for an equivalent depth in the reference well, where determining the depth shift includes looking up values, one for each datum, in the pressure-depth lookup table for each given well, and where depth shifts are linearly interpolated from one datum to another to avoid discontinuities in an amount of shift.

A second feature, combinable with any of the previous or following features, where determining the depth shifts includes using a depth-shift formula that varies based on depth and datum, and where the depth-shift formula provides an appropriate pressure shift for each depth shifted pressure point.

A third feature, combinable with any of the previous or following features, where the depth-shift formula is based on a formula used for pressure predictions within inclined aquifers, including predicting pressures based on a gradient determined by a density of fluid in the inclined aquifers.

A fourth feature, combinable with any of the previous or following features, the method further including receiving, through the GUI, user input for optimizing parameters, locations, and safe drilling of wells drilled in exploration, development, and production settings for petrochemical companies or $CO_2$ sequestration companies undertaking deep well drilling operations.

A fifth feature, combinable with any of the previous or following features, where the user input includes user selections of parameters to optimize a selected well of the group of multiple wells.

A sixth feature, combinable with any of the previous or following features, where the set of geological boundaries define a porous layer that varies in depth for each well of the group of multiple wells.

A seventh feature, combinable with any of the previous or following features, where the pressures are measured pore fluid pressures.

In a second implementation, a non-transitory, computer-readable medium stores one or more instructions executable by a computer system to perform operations including the following. A set of geological boundaries are identified for a group of multiple wells in a region that includes a reference well. Each well of the group of multiple wells has geological boundaries at different depths from same geological boundaries in the reference well. A framework of the geological boundaries of the reference well and the group of multiple wells is treated as a set of datums for shifting pressures relative to the reference well. Geological boundaries of the group of multiple wells are matched, including identifying tops and bases of geological layers for each well of the group of multiple wells. Depth shifts for depths having corresponding pressure data are determined using the matched geological boundaries. The depth shifts are redatumed based on differences in depth of the geological layers of each well. A display of a graph is presented in a graphical user interface (GUI). The graph maps pressures of the group of multiple wells at different depths and based on redatuming of each well of the group of multiple wells to a datum of the reference well.

The foregoing and other described implementations can each, optionally, include one or more of the following features:

A first feature, combinable with any of the following features, the operations further including determining a pressure-depth lookup table for each given well of the group of multiple wells, where each pressure-depth lookup table provides, for each given well and a different datum for the given well, a depth shift of a given well to adjust pressure data for the given well relative to an offset for an equivalent depth in the reference well, where determining the depth shift includes looking up values, one for each datum, in the pressure-depth lookup table for each given well, and where depth shifts are linearly interpolated from one datum to another to avoid discontinuities in an amount of shift.

A second feature, combinable with any of the previous or following features, where determining the depth shifts includes using a depth-shift formula that varies based on depth and datum, and where the depth-shift formula provides an appropriate pressure shift for each depth shifted pressure point.

A third feature, combinable with any of the previous or following features, where the depth-shift formula is based on a formula used for pressure predictions within inclined aquifers, including predicting pressures based on a gradient determined by a density of fluid in the inclined aquifers.

A fourth feature, combinable with any of the previous or following features, the operations further including receiving, through the GUI, user input for optimizing parameters, locations, and safe drilling of wells drilled in exploration, development, and production settings for petrochemical companies or $CO_2$ sequestration companies undertaking deep well drilling operations.

A fifth feature, combinable with any of the previous or following features, where the user input includes user selections of parameters to optimize a selected well of the group of multiple wells.

A sixth feature, combinable with any of the previous or following features, where the set of geological boundaries define a porous layer that varies in depth for each well of the group of multiple wells.

A seventh feature, combinable with any of the previous or following features, where the pressures are measured pore fluid pressures.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. A set of geological boundaries are identified for a group of multiple wells in a region that includes a reference well. Each well of the group of multiple wells has geological boundaries at different depths from same geological boundaries in the reference well. A framework of the geological boundaries of the reference well and the group of multiple wells is treated as a set of datums for shifting pressures relative to the reference well. Geological boundaries of the group of multiple wells are matched, including identifying tops and bases of geological layers for each well of the group of multiple wells. Depth shifts for depths having corresponding pressure data are determined using the matched geological boundaries. The depth shifts are redatumed based on differences in depth of the geological layers of each well. A display of a graph is presented in a graphical user interface (GUI). The graph maps pressures of the group of multiple wells at different depths and based on redatuming of each well of the group of multiple wells to a datum of the reference well.

The foregoing and other described implementations can each, optionally, include one or more of the following features:

A first feature, combinable with any of the following features, the operations further including determining a pressure-depth lookup table for each given well of the group of multiple wells, where each pressure-depth lookup table provides, for each given well and a different datum for the given well, a depth shift of a given well to adjust pressure data for the given well relative to an offset for an equivalent depth in the reference well, where determining the depth shift includes looking up values, one for each datum, in the pressure-depth lookup table for each given well, and where depth shifts are linearly interpolated from one datum to another to avoid discontinuities in an amount of shift.

A second feature, combinable with any of the previous or following features, where determining the depth shifts includes using a depth-shift formula that varies based on depth and datum, and where the depth-shift formula provides an appropriate pressure shift for each depth shifted pressure point.

A third feature, combinable with any of the previous or following features, where the depth-shift formula is based on a formula used for pressure predictions within inclined aquifers, including predicting pressures based on a gradient determined by a density of fluid in the inclined aquifers.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY.

The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
identifying a set of geological boundaries for a group of multiple wells in a region that includes a reference well, wherein each well of the group of multiple wells has geological boundaries at depths that are different from depths of geological boundaries in the reference well;
matching geological boundaries of the group of multiple wells, including identifying tops and bases of geological layers for each well of the group of multiple wells;
determining a framework of the geological boundaries of the reference well and the group of multiple wells, wherein the framework includes a set of datums identifying shifts of pressures relative to the reference well;
determining, using the framework and the matched geological boundaries, depth shifts for depths having corresponding pressure data, wherein the depth shifts are redatumed based on differences in depth of the geological layers of each well;
presenting, in a graphical user interface (GUI), a display of a graph mapping pressures of the group of multiple wells at different depths and based on redatuming of each well of the group of multiple wells to a datum of the reference well, wherein the graph shows that the geological boundaries of the group of multiple wells identify same geological layers at different depths at respective well locations;
optimizing, based on the framework, parameters, locations, and safe drilling operations of wells in the group of multiple wells, by applying a reduction of well design requirements, based on the framework, to determine optimized parameters, optimized locations, and optimized safe drilling operations of the wells in the group of multiple wells; and drilling, based on the optimized parameters, the optimized locations, and the optimized safe drilling operations, the wells in the group of multiple wells.

2. The computer-implemented method of claim 1, further comprising:

determining a pressure-depth lookup table for each given well of the group of multiple wells, wherein each pressure-depth lookup table provides, for each given well and using a different datum for the given well, a depth shift of the given well to adjust pressure data for the given well relative to an offset for an equivalent depth in the reference well, wherein determining the depth shift includes looking up values, one for each datum, in the pressure-depth lookup table for each given well, and wherein depth shifts are linearly interpolated from one datum to another to avoid discontinuities in an amount of shift.

3. The computer-implemented method of claim 1, wherein determining the depth shifts includes using a depth-shift formula that varies based on depth and datum, and wherein the depth-shift formula provides an appropriate pressure shift for each depth shifted pressure point.

4. The computer-implemented method of claim 3, wherein the depth-shift formula is based on a formula used for pressure predictions within inclined aquifers, including predicting pressures based on a gradient determined by a density of fluid in the inclined aquifers.

5. The computer-implemented method of claim 1, further comprising:

receiving, through the GUI, user input for optimizing the parameters, locations, and safe drilling of wells drilled in exploration, development, and production settings for petrochemical companies or $CO_2$ sequestration companies undertaking deep well drilling operations.

6. The computer-implemented method of claim 5, wherein the user input includes user selections of parameters to optimize a selected well of the group of multiple wells.

7. The computer-implemented method of claim 1, wherein the set of geological boundaries define a porous layer that varies in depth for each well of the group of multiple wells.

8. The computer-implemented method of claim 1, wherein the pressures are measured pore fluid pressures.

9. A non-transitory, computer-readable medium storing one or more instructions executable by a computer system to perform operations comprising:

identifying a set of geological boundaries for a group of multiple wells in a region that includes a reference well, wherein each well of the group of multiple wells has geological boundaries at depths that are different from depths of geological boundaries in the reference well;

matching geological boundaries of the group of multiple wells, including identifying tops and bases of geological layers for each well of the group of multiple wells;

determining a framework of the geological boundaries of the reference well and the group of multiple wells, wherein the framework includes a set of datums identifying shifts of pressures relative to the reference well;

determining, using the framework and the matched geological boundaries, depth shifts for depths having corresponding pressure data, wherein the depth shifts are redatumed based on differences in depth of the geological layers of each well;

presenting, in a graphical user interface (GUI), a display of a graph mapping pressures of the group of multiple wells at different depths and based on redatuming of each well of the group of multiple wells to a datum of the reference well, wherein the graph shows that the geological boundaries of the group of multiple wells identify same geological layers at different depths at respective well locations;

optimizing, based on the framework, parameters, locations, and safe drilling operations of wells in the group of multiple wells, by applying a reduction of well design requirements, based on the framework, to determine optimized parameters, optimized locations, and optimized safe drilling operations of the wells in the group of multiple wells; and drilling, based on the optimized parameters, the optimized locations, and the optimized safe drilling operations, the wells in the group of multiple wells.

10. The non-transitory, computer-readable medium of claim 9, the operations further comprising:

determining a pressure-depth lookup table for each given well of the group of multiple wells, wherein each pressure-depth lookup table provides, for each given well and using a different datum for the given well, a depth shift of the given well to adjust pressure data for the given well relative to an offset for an equivalent depth in the reference well, wherein determining the depth shift includes looking up values, one for each datum, in the pressure-depth lookup table for each given well, and wherein depth shifts are linearly interpolated from one datum to another to avoid discontinuities in an amount of shift.

11. The non-transitory, computer-readable medium of claim 9, wherein determining the depth shifts includes using a depth-shift formula that varies based on depth and datum, and wherein the depth-shift formula provides an appropriate pressure shift for each depth shifted pressure point.

12. The non-transitory, computer-readable medium of claim 11, wherein the depth-shift formula is based on a formula used for pressure predictions within inclined aquifers, including predicting pressures based on a gradient determined by a density of fluid in the inclined aquifers.

13. The non-transitory, computer-readable medium of claim 9, the operations further comprising:

receiving, through the GUI, user input for optimizing the parameters, locations, and safe drilling of wells drilled in exploration, development, and production settings for petrochemical companies or $CO_2$ sequestration companies undertaking deep well drilling operations.

14. The non-transitory, computer-readable medium of claim 13, wherein the user input includes user selections of parameters to optimize a selected well of the group of multiple wells.

15. The non-transitory, computer-readable medium of claim 9, wherein the set of geological boundaries define a porous layer that varies in depth for each well of the group of multiple wells.

16. The non-transitory, computer-readable medium of claim 9, wherein the pressures are measured pore fluid pressures.

17. A computer-implemented system, comprising:

one or more processors; and a non-transitory computer-readable storage medium coupled to the one or more processors and storing programming instructions for execution by the one or more processors, the programming instructions instructing the one or more processors to perform operations comprising:

identifying a set of geological boundaries for a group of multiple wells in a region that includes a reference well, wherein each well of the group of multiple wells has geological boundaries at depths that are different from depths of geological boundaries in the reference well;

matching geological boundaries of the group of multiple wells, including identifying tops and bases of geological layers for each well of the group of multiple wells;

determining a framework of the geological boundaries of the reference well and the group of multiple wells, wherein the framework includes a set of datums identifying shifts of pressures relative to the reference well;

determining, using the framework and the matched geological boundaries, depth shifts for depths having corresponding pressure data, wherein the depth shifts are redatumed based on differences in depth of the geological layers of each well;

presenting, in a graphical user interface (GUI), a display of a graph mapping pressures of the group of multiple wells at different depths and based on redatuming of each well of the group of multiple wells to a datum of the reference well, wherein the graph shows that the geological boundaries of the group of multiple wells identify same geological layers at different depths at respective well locations;

optimizing, based on the framework, parameters, locations, and safe drilling operations of wells in the group of multiple wells, by applying a reduction of well design requirements, based on the framework, to determine optimized parameters, optimized locations, and optimized safe drilling operations of the wells in the group of multiple wells; and drilling, based on the optimized parameters, the optimized locations, and the optimized safe drilling operations, the wells in the group of multiple wells.

18. The computer-implemented system of claim 17, the operations further comprising:

determining a pressure-depth lookup table for each given well of the group of multiple wells, wherein each pressure-depth lookup table provides, for each given well and using a different datum for the given well, a depth shift of the given well to adjust pressure data for the given well relative to an offset for an equivalent depth in the reference well, wherein determining the depth shift includes looking up values, one for each datum, in the pressure-depth lookup table for each given well, and wherein depth shifts are linearly interpolated from one datum to another to avoid discontinuities in an amount of shift.

19. The computer-implemented system of claim 17, wherein determining the depth shifts includes using a depth-shift formula that varies based on depth and datum, and wherein the depth-shift formula provides an appropriate pressure shift for each depth shifted pressure point.

20. The computer-implemented system of claim 19, wherein the depth-shift formula is based on a formula used for pressure predictions within inclined aquifers, including predicting pressures based on a gradient determined by a density of fluid in the inclined aquifers.

* * * * *